United States Patent [19]

Raetz

[11] 4,293,003
[45] Oct. 6, 1981

[54] MIXTURE CONTROL DEVICE FOR SERVICE WATER INSTALLATIONS HAVING A LOW SUPPLY TEMPERATURE

[76] Inventor: Karlheinz Raetz, Brunswick, Fed. Rep. of Germany

[21] Appl. No.: 72,923

[22] Filed: Sep. 6, 1979

[30] Foreign Application Priority Data

Sep. 8, 1978 [DE] Fed. Rep. of Germany ....... 2839152

[51] Int. Cl.³ ............................................. F16K 11/22
[52] U.S. Cl. .................... 137/637.4; 137/605
[58] Field of Search ...................... 137/625.41, 625.17, 137/637.3, 637.4, 605

[56] References Cited

U.S. PATENT DOCUMENTS

| 1,876,512 | 9/1932 | Pfening et al. | 137/625.41 X |
| 2,822,112 | 2/1958 | Bremer | 137/625.41 X |
| 3,324,884 | 6/1967 | Dornaus | 137/625.17 |

FOREIGN PATENT DOCUMENTS 829905 4/1938 France ............................ 137/625.41

Primary Examiner—Arnold Rosenthal
Attorney, Agent, or Firm—Michael J. Striker

[57] ABSTRACT

The mixture control device is connected to a warm water installation having relatively low supply temperature and including an outlet conduit of the warm water, a parallel outlet conduit of the warm water connected in series with an electrical flow heater and a supply conduit of cold water. A mixture control device has a housing defining a mixing chamber and having three inlets and and outlet. The inlets are connected respectively, to the hot water conduit, the warm water conduit and the cold water conduit. Control means including two superimposed ceramic disks are arranged between the inlet ports and the mixing chamber. One of the disks is stationary and is provided with three inlet bore holes arranged on a concentric circle and communicating with respective inlets. The other control disk is rotatable and is provided with control bore holes arranged on a similar concentric circle in such a manner as to selectively establish a communication of the hot water inlet and of the warm water inlet with the chamber while closing the cold water inlet and in a second control range to establish a communication of the warm water inlet and of the cold water inlet with the chamber while closing the hot water inlet.

8 Claims, 10 Drawing Figures

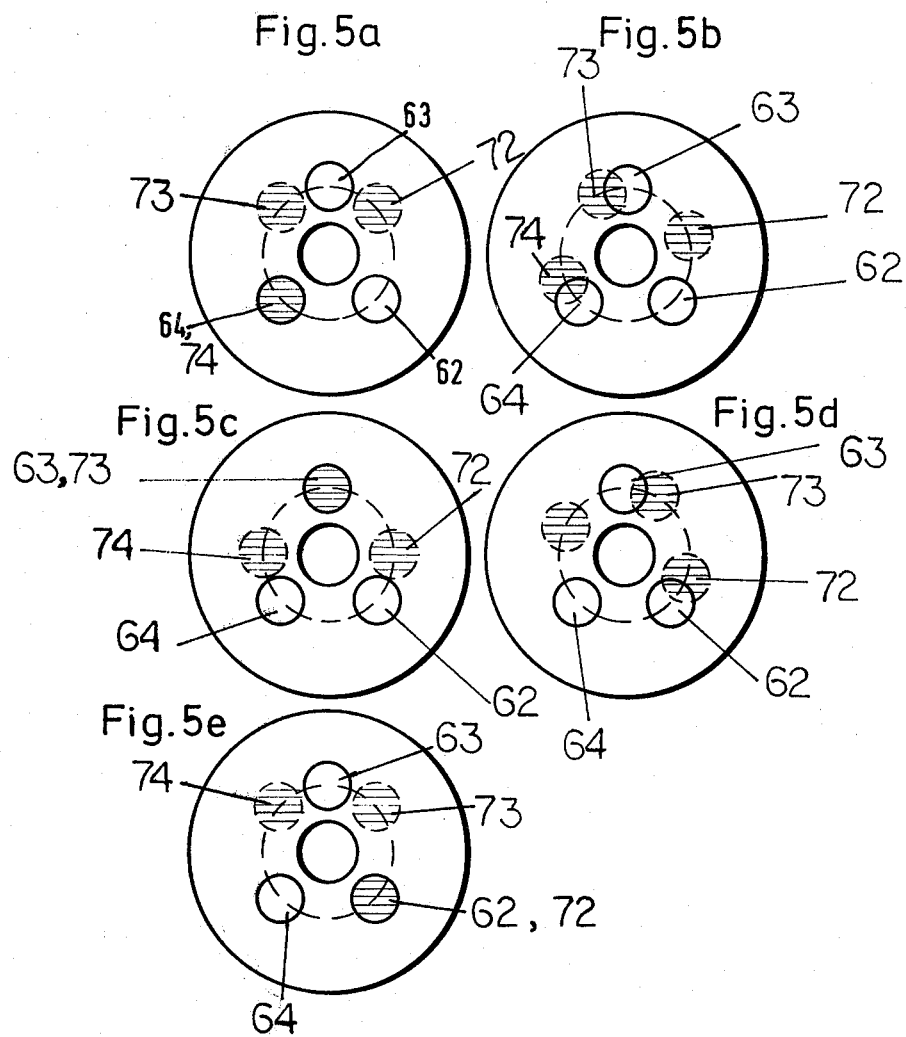
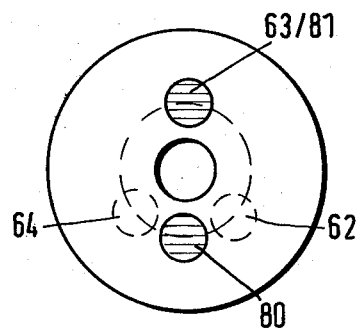
Fig. 6

MIXTURE CONTROL DEVICE FOR SERVICE WATER INSTALLATIONS HAVING A LOW SUPPLY TEMPERATURE

BACKGROUND OF THE INVENTION

This invention relates generally to control devices for mixing water of different temperatures and more particularly it relates to such a mixture control device for use in connection with a warm water installation having a relatively low supply temperature.

In view of the shortage of fossil fuels, there are increasingly employed heat generators employing solar energy, heat pumps and long-distance heating for raising the temperature of heating water and of service water.

Heating energy derived from sun and the heating energy derived from heat pumps are to be generated, the former for technological reasons and the latter for thermodynamic reasons, at as low temperatures as possible, such as for example at 40° C.

Also, in the case of the long-distance heating, measures are being taken to lower the return temperature from conventional 70° C. to a temperature below 40° C. in order to eliminate the loss in thermal efficiency of a power plant resulting due to the so-called "heat-power coupling" at a high return temperature.

In the case of the service water supply this lower temperature is sufficient for all applications having high water and energy consumption such as for example washing, bathing and showering. Only for the rinsing of dishes and for the additional heating of cooled-down bathing water, higher water temperatures are necessary. For this reason contemporary warm water reservoirs having the relatively low temperature are equipped with flow heaters which heat up the service water from about 40° C. to about 70° C. The additional heating can be effected with advantage only electrically inasmuch as it is the primary purpose of such installations to eliminate, at sufficiently high ambient temperatures, the use of auxiliary heating units operating on fossil fuel.

The electrical after-heating of service water which has been already sufficiently raised in temperature and the subsequent cooling down thereof to a service temperature by mixing the after-heated water with a cold water contradicts however to the thermodynamical principle according to which the heat should be generated at such a temperature at which it is used.

SUMMARY OF THE INVENTION

It is, therefore, a general object of the present invention to overcome the aforementioned disadvantage.

More particularly, it is an object of the invention to provide an improved mixing device for use in connection with warm water installations of the aforedescribed type, namely having a reservoir of warm water of relatively low temperature, a cold water supply and an electrical flow heater for supplying hot water, which meets the thermodynamic and practical requirements in such a manner as to achieve a significant saving of energy.

In keeping with these objects, and others which will become apparent hereafter, one feature of the invention resides, in the provision of a mixture control device for the installations of the above-described type which has a mixing chamber including control means cooperating with respective water inlets in such a manner that in one range of control positions only the mixing of the warm water and of the hot water takes place whereas in another range of control positions only the mixture of the warm water with the cold water is possible. The mixing operation is effected in such a way that the temperature interval from the cold water to the hot water can be adjusted without any temperature jump.

The temperature control as well as the flow control are functionally separated so that at a certain temperature the mixture control device when opened delivers always water having a uniform temperature. In this manner time consuming temperature adjustment which hitherto is necessary in mixture control sets operated by two hands and also the excessive energy and water consumption, are effectively avoided.

The energy and water saving is also enhanced by controlling the flow rate by means of a spindle having a low pitch of its thread.

Preferably, the temperature is controlled via a lever that enables a visible adjustment.

In a preferred embodiment of this invention the mixture control device has a housing enclosing the mixing chamber and being provided with three inlets for supplying respectively, hot water, warm water and cold water and an outlet, control means in the form of two superimposed ceramic kisks, one of the disks being a stationary one having three inlet bore holes arranged on a concentric circle at predetermined angular intervals relative to the center of the stationary disk and each bore hole communicating with one of the inlets, the other disk being rotatable about the center of the stationary disk and having three control bore holes arranged on a similar concentric circle at such angular intervals relative to the axis of rotation as to overlap always two adjacent inlet bore holes in the stationary disk so as to admit in the mixing chamber two adjacent temperature stages.

By turning the rotary ceramic disk it is attained, that in certain positions of this disk only two adjacent inlet bore holes in the stationary disk connected to water conduits from adjacent temperature stages, are simultaneously controlled to admit these two temperature stages into the mixing chamber. As a rule, the temperature stages in respective water inlets correspond to a cold water supply, a warm water supply with a temperature of about 40° C. delivered from a low temperature installation, and a hot water supply with a temperature of about 70° C. delivered from an electric flow heater.

In another preferred embodiment of this invention which is very simple in structure, the two ceramic disks are provided with central bores forming an axial passage leading into the mixing chamber. The incoming water enters the mixing chamber via one or two of the control bore holes on the concentric circle and is discharged therefrom in a counter direction through the centric passage.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIGS. 5a, 5b, 5c, 5d and 5e show main control positions of the two ceramic plates in the control means of the device of this invention; and FIG. 6 is a plan view with another embodiment of the control disk having two bore holes.

DESCRIPTION OF THE PREFERRED EMBODIMENTS

Figure 1:
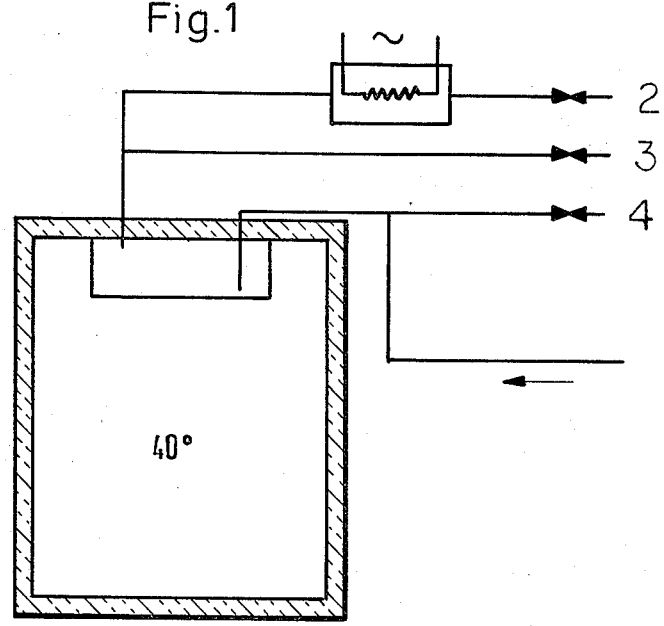
FIG. 1 is a schematic diagram of a service water installation having a relatively low temperature for use in connection with the mixture control device of this invention.

Referring firstly to FIG. 1, the shown service water installation differs from contemporary ones where an electric flow heater is connected in series with the warm water conduit, in the feature that there is provided an additional warm water conduit leading from the reservoir parallel to the electric flow heater and connected directly to the mixture control device to supply a relatively low temperature warm water without any additional heating.

Figure 2:
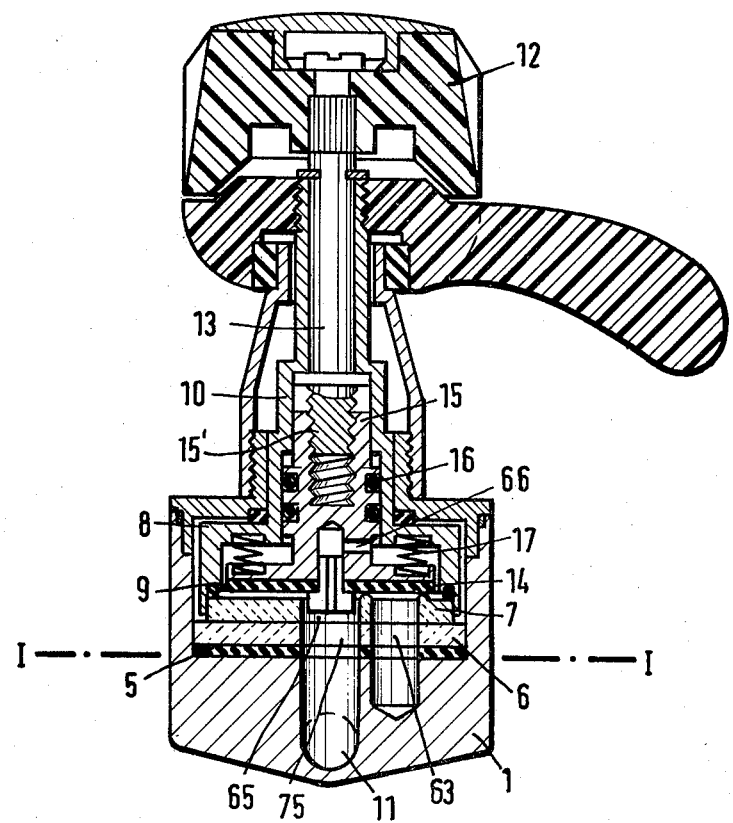
FIG. 2 is a longitudinal section of a mixture control device of this invention.
Figure 3:
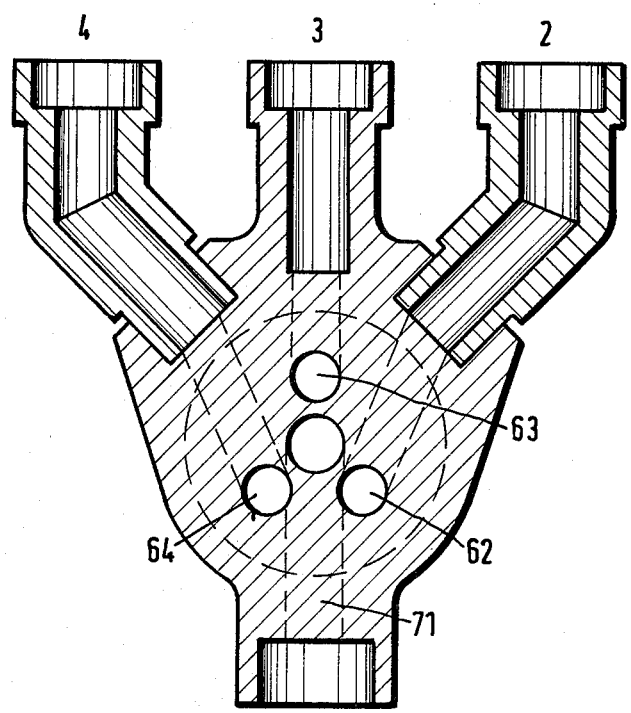
FIG. 3 is a sectional plan view of the device of FIG. 2 taken along the line I—I.

The mixture control device for use with the service water installation of FIG. 1 is illustrated in FIGS. 2 and 3. The device has a housing 1 provided with three inlet ports, namely a hot water inlet port 2, a warm water inlet port 3 and a cold water inlet port 4. The corresponding inlet passages lead from below to a mixing chamber 9 in which is arranged control means assembled of two ceramic disks 6 and 7. The lower ceramic disk 6 is fixedly mounted in the chamber 9 and is secured to the bottom of the latter by a sealing disk 5. The stationary ceramic disk 6 as seen in FIG. 3, has three inlet bore holes 62, 63 and 64 arranged on a concentric circle and being spaced apart one from another at predetermined angular intervals relative to the center of the disk 6. The sealing disk 5 is provided with corresponding bore holes which communicate with respective inlet ports 2, 3 and 4. Superimposed on the stationary disk 6 is a rotary disk 7, illustrated in detail in FIG. 4. The rotary disk 7 sealingly bears on the upper surface of the stationary disk 6 and is also connected at its periphery to a stepped sleeve 8 which is rotatable from the outside by a tubular rod 10 projecting from the housing 1. The rotary disk 7 has three control bore holes 72, 73 and 74 arranged on a similar concentric circle as the inlet holes 62 through 64. The mutual angular position of the control holes 72 through 74 is selected such that only two control bore holes can partially overlap a pair of underlying inlet bore holes in the stationary disk 6 to admit water of adjacent temperature stages into the mixing chamber while shutting off the remaining temperature stage.

The main control positions of the two disks 6 and 7 are illustrated in FIG. 5. In the position of FIG. 5a only cold water from inlet port 4 flows via the inlet bore hole 64 and the aligned control bore hole 74 into the mixing chamber 9. In the position according to FIG. 5b the mixing of cold water and of warm water takes place via partially overlapping bore holes 64, 74 and 63, 73. In the position 5c, only warm water from the inlet port 63 is admitted into the mixing chamber 9 via the fully aligned bore holes 63 and 73. In the position 5d the mixing of warm water and hot water takes place via the partially overlapping adjacent pairs of bore holes 63, 73 and 62, 72. Finally, in the position 5e only hot water is discharged from the mixture control device via the overlapping bore holes 62 and 72. Water admitted in the mixing chamber 9 is discharged from the latter in a counter direction via central bore holes 65 and 75 in respective disks 6 and 7 and through the discharge or outlet port 11.

The flow rate is controlled by rotating a knob 12 which is connected to a spindle 13 passing through the tubular rod 10 into the stepped sleeve 8. A sealing disk 14 of an elastic material is connected to a hectagonal guiding member 15 arranged for a sliding movement in the sleeve 8. Since the guiding member 15 is guided in a fixed angular position relative to the rotatable sleeve 8, the sealing disk 14 cannot be rotated relative to the control disk 7. This measure is necessary for preventing any damage of the sealing disk 14 when the mixture control device is closed and the control rod 10 is rotated.

The static and the dynamic friction between the spindle 13 and the inner wall of rod 10 has to be selected smaller than the friction between the rod 10 and the stationary parts of the housing 1 in order to prevent joint rotation of the rod 10 and of the control knob 12.

The hexagonal guiding member 15 has an inter thread 15' engaging the corresponding thread of the spindle 13 and is situated above sealing rings 16 to be protected against calcification or other sediments.

An increased friction occurs also in the case of the closed sealing disk 14 due to water pressure acting assymetrically on the sealing disk. In order to partially correct the torsional moment resulting due to the water pressure, three or more pressure springs 17 are arranged between the sealing disk 14 and the sleeve 8 to counter balance the hydraulic pressure in the closed position of the disk 14. In order to prevent a discharge of incoming water from the mixing chamber along the spindle 13 in the event that an accidental leak in the mixing chamber takes place, the sealing disk 14 is provided with an overflow bore hole 66 leading from the mixing chamber 9 to the outlet port 11.

Figure 4:
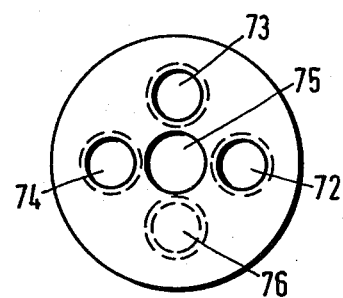
FIG. 4 is a plan view of a control disk.

In the embodiment of the control disk 7 as illustrated in FIG. 4 there are provided three control bore holes 72, 73 and 74 each having an annular sealing edge. The fourth blind sealing edge 76 is provided on the disk 7 to ensure that the sealing disk 14 bears on all sealing edges of the disk 7.

In a simplified embodiment of the control disk 7 as shown in FIG. 6, there are provided only two control bore holes 80 and 81 arranged opposite each other on the same concentric circle as the inlet bore holes 62 through 64. One control bore hole 81 is movable in the range of the inlet bore hole 63 of the stationary disk 6 and the other control bore hole 80 is movable in the range of a pair of inlet bore holes 62 and 64 of the stationary disk. Also, in this embodiment, two blind sealing edges displaced about 90° relative to the bore holes 80 and 81 are provided in order to ensure a flat abutment of the sealing disk 14.

It will be understood that each of the elements described above, or two or more together, may also find a useful application in other types of construction differing from the type described above.

While the invention has been illustrated and described as embodied in a specific embodiment of the mixture control device for use with service water installations having a relatively low temperature, it is not intended to be limited to the details shown, since various modifications and structural changes may be made without departing in any way from the spirit of the present invention.

What is claimed as new and desired to be protected by Letters Patent is set forth in the appended claims:

1. A mixture control device for use in connection with a service water installation having a relatively low supply temperature, comprising:
a housing enclosing a mixing chamber and having three inlets and an outlet, said inlets being connectable respectively to a hot water conduit, a warm water conduit and a cold water conduit and said outlet communicating with said mixing chamber;
control means arranged between said inlets and said chamber, said control means being operable between a first temperature control range in which it establishes a communication of said hot water inlet and said warm water inlet with said chamber while closing said cold water inlet and a second control range in which it establishes a communication of said warm water water inlet and of said cold water inlet with the chamber while closing said hot water inlet; said control means including two superimposed disks, one of the disks being a stationary one having three inlet bore holes arranged on a concentric circle at predetermined angular intervals relative to the center of the disk and each communicating with one of said inlets, the other disk being rotatable about its center and having three control bore holes arranged on a similar concentric circle at such angular intervals relative to each other as to overlap always two adjacent inlet bore holes in said stationary disk.

2. A device as defined in claim 1 wherein said stationary disk and said rotary disk are respectively, of a ceramic material.

3. A device as defined in claim 1 wherein said control means further includes a vertically movable sealing disk arranged in said mixing chamber for joint rotation with said rotary disk and being operable for opening and, alternatively, closing said control bore holes.

4. A device as defined in claim 3 further including a control sleeve secured to the periphery of said rotary disk and enclosing said sealing disk.

5. A device as defined in claim 4 further including a plurality of pressure springs arranged between said sealing disk and the inner wall of said sleeve to equalize hydraulic pressure in the closed position of said sealing disk.

6. A device as defined in claim 1 wherein said stationary disk and said rotary disk is provided with a central bore hole connecting said mixing chamber to said outlet.

7. A device as defined in claim 5 wherein said sealing disk is connected to an internally threaded guiding member movable in an axial direction in said sleeve and having a fixed angular position relative to the latter, said control means further including a control spindle engaging the internal thread of said guiding member.

8. A mixture control device for use in connection with a service water installation having a relatively low supply temperature, comprising:
a housing enclosing a mixing chamber and having three inlets and an outlet, said inlets being connectable respectively to a hot water conduit, a warm water conduit and a cold water conduit and said outlet communicating with said mixing chamber;
control means arranged between said inlets and said chamber, said control means being operable between a first temperature control range in which it establishes a communication of said hot water inlet and said warm water inlet with said chamber while closing said cold water inlet and a second control range in which it establishes a communication of said warm water water inlet and of said cold water inlet with the chamber while closing said hot water inlet; said control means including two superimposed disks, one of said disks being a stationary one having three inlet bore holes arranged on a concentric circle at predetermined angular intervals relative to the center of the disk and each communicating with one of said inlets, the other disk being rotatable about the center of the stationary disk and having two diametrically opposed control bore holes arranged on a similar concentric circle and being movable to overlap only two of said inlet bore holes.

* * * * *